United States Patent [19]

Cheney et al.

[11] Patent Number: 5,333,301
[45] Date of Patent: Jul. 26, 1994

[54] DATA TRANSFER BUS SYSTEM AND METHOD SERVING MULTIPLE PARALLEL ASYNCHRONOUS UNITS

[75] Inventors: Dennis P. Cheney, Vestal; James N. Dieffenderfer, Endicott, both of N.Y.; Ronald A. Oreshan, Tucson, Ariz.; Robert J. Yagley, Endicott, N.Y.

[73] Assignee: International Business Machines Corporation, Armonk, N.Y.

[21] Appl. No.: 626,706

[22] Filed: Dec. 14, 1990

[51] Int. Cl.⁵ .................. G06F 13/42; G06F 11/10
[52] U.S. Cl. ............................. 395/575; 395/275; 395/425
[58] Field of Search ............... 395/575, 275, 425; 364/DIG. 1

[56] References Cited

U.S. PATENT DOCUMENTS

| | | | |
|---|---|---|---|
| 4,268,906 | 4/1981 | Bourke et al. | 395/700 |
| 4,423,480 | 12/1983 | Bauer et al. | 395/325 |
| 4,509,121 | 4/1985 | Rey et al. | 395/775 |
| 4,616,337 | 10/1986 | Sheth | 395/275 |
| 4,779,089 | 10/1988 | Theus | 340/825.5 |
| 4,866,604 | 9/1989 | Reid | 395/325 |
| 4,888,691 | 12/1989 | George et al. | 395/700 |
| 4,958,351 | 9/1990 | Flora et al. | 371/40.1 |
| 5,079,696 | 1/1992 | Priem et al. | 395/500 |

OTHER PUBLICATIONS van de Goor, A., *Computer Architecture and Design*, Addison-Wesley Publishing Co., 1989, pp. 368-375.
Carlson, D., "Bit-Oriented Data Link Control Procedures", *IEEE Transactions on Communications*, vol. COM-28, No. 4, Apr. 1980, pp. 455-467.
Abstracts from *Assignee Search of Patents Assigned to Storage Technology Corporation* (Search Conducted Oct. 23, 1990).

*Primary Examiner*—Stephen M. Baker
*Attorney, Agent, or Firm*—Sterne, Kessler, Goldstein & Fox

[57] ABSTRACT

A system and method for transferring data between a single channel unit and multiple asynchronous storage devices. One embodiment of the present invention uses read strobe signals to indicate when the storage devices are to send data over a data bus, and to initiate a validity count-down which indicates when the data on the data bus is valid. When the count-down has completed, the data on the data bus is sampled. Another embodiment further includes checking the data for array parity errors while the data is sent and received to and from the storage devices.

23 Claims, 9 Drawing Sheets

DATA TRANSFER BUS SYSTEM AND METHOD SERVING MULTIPLE PARALLEL ASYNCHRONOUS UNITS

BACKGROUND OF THE INVENTION

I. Field of the Invention

The present invention is a system and method for transferring data between asynchronous devices. More specifically, this invention relates to a system and method for transferring data between a single channel device and multiple asynchronous storage devices simultaneously, and for performing such transfer with improved error detection and fault isolation.

II. Related Art

In recent years, there has been an enormous increase in the speed and general capabilities of computers. This has been driven largely by the desires of people to solve larger and more complex problems. In view of the size of some of these problems and the amounts of raw data that they require, the speed and power of computer peripherals such as mass-storage devices has become very important in order to take full advantage of a powerful computer.

The speed of mass-storage devices has traditionally lagged significantly behind the speed of state-of-the-art computers. This is largely due to the fact that, unlike the computational portion of a computer (referred to as the "host computer"), mass-storage devices contain moving parts. Consequently, there is a continuing need for faster data storage devices which can effectively work in conjunction with today's high speed computers.

At any given point in time, state-of-the-art storage devices are capable of some finite rate of throughput. Thus, the effective speed of the host is often limited in certain respects to whatever this rate of throughput happens to be. In addition, state-of-the-art storage devices tend to be very expensive.

To help alleviate these problems, the concept of integrally connecting multiple storage devices was developed. This concept is described further with regard to FIG. 1.

Figure 1:
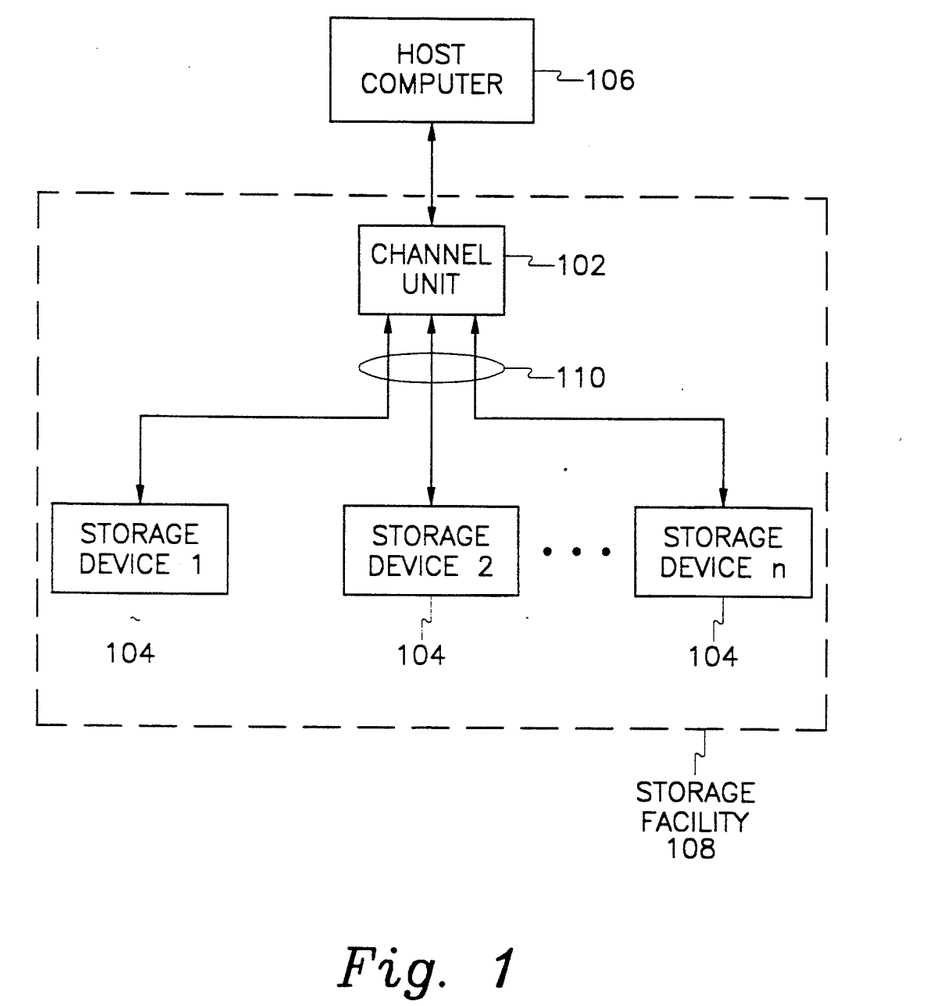
FIG. 1 is a block diagram of a storage unit having multiple storage devices.

Referring now to FIG. 1, a storage facility 108 is shown to comprise a channel unit 102, and n storage devices 104. When the storage facility 108 receives data from a host computer 106 for storage (that is, a "write" is requested), the data is sent to a channel unit 102. Either some other device (not shown) or the channel unit 102 itself stripes (that is, splits up) the data into sections or groups. For example, each section might be 2 bytes in length. When the data is sent to the storage devices 104, storage device 1 might, for example, receive the first section, storage device 2 the second, etc., until storage device n receives the $n^{th}$ section. This process then repeats itself, with storage device 1 receiving the $n_{th}+1$ section, etc.

The data is sent to the storage devices 104 from the channel unit 102 across a bus 110. The bus 110 is made up of individual bus links (n links) having one end at one of the storage devices 104, and the other at the channel unit 102. The striped data sent at any given time on the bus 110 (that is, the sum of the data on all n links at a given time) is referred to as a "word." In addition to data, this bus 110 can typically facilitate the transfer of control signals as well.

When the host computer 106 requests that the stored data be retrieved from the storage devices 104 (that is, a "read" is requested), the storage devices 104 of the storage facility 108 send the stored data back to the channel unit 102 across the bus 102. The data is then interleaved together by some means, and sent to the host computer 106. Of course, in order for this do be done efficiently, the data from the individual storage devices 104 should be received by the channel unit 102 concurrently (that is, all the components of the "word" should arrive at the channel unit 102 at once).

Since the host computer 106 interfaces only with the channel unit 102 and not with the individual storage devices 104, the use of multiple storage devices 104 is transparent to the host computer. What the host computer 106 will notice, however, is a tremendous increase in throughput over the use of a single storage device 104.

In the type of devices contemplated by storage facility 108 of FIG. 1, each of the storage devices 104 typically contain a microprocessor, memory, logic and software to control the operation of the storage device 104. Therefore, each of the storage devices 104 contain an oscillator to drive the clocks for the microprocessor and logic. This use of multiple oscillators allows for greater flexibility in design, since components are not required to run at the same speed (or multiple thereof) as a master oscillator. Thus, problems regarding precise synchronizing of phase between devices are not encountered.

In addition to each of storage devices 104 containing its own oscillator, the channel unit 102 is also contemplated to contain its own oscillator to drive the clocks of its microprocessor and logic. Thus, not only are the storage devices 104 operating asynchronously with regard to each other, they are also operating asynchronously with regard to the channel unit 102 as well. In such an environment, all of the data transfers between the storage devices 104 and channel unit 102 take place over multiple asynchronous interfaces.

Use of asynchronous interfaces, however, is not without its own problems. In order for data to be transferred from the storage devices 104 to the channel unit 102 concurrently in an efficient manner, the bus or busses involved in this transfer must be able to accommodate the asynchronicity of the devices discussed above. The problem with sending data from the storage devices 104 to the channel unit 102 over an asynchronous interface is that the storage devices 104 need some indication when to transfer the data. Since each of the storage devices 104 do not continuously communicate with each other or with other devices, some communication mechanism is necessary to enable all of the storage devices 104 to send data concurrently with one another. In addition, the asynchronicity of the system also makes it difficult for the channel unit 102 to know when it can sample the bus, and be assured that the sampled data is valid.

Typically, the nature of asynchronous transfers requires that the asynchronous devices on both sides of a data transfer establish synchronism with each other. Problems of metastability removal (that is, removal of the occurrence of a condition in devices such as flip flops where these devices are unable to maintain a specific state) make this task more difficult.

The use of multiple storage devices 104 generally as described above also can cause problems relating to error detection and fault isolation. This is true especially where cheaper, less reliable storage devices are used. If one device begins to malfunction, it is important to detect it early, and to detect whether the error came from one of the storage devices 104, or the channel unit 102.

Thus, what is needed is a way to receive striped data simultaneously from multiple asynchronous storage devices 104 in an efficient manner, and to provide an interface generally between a channel unit 102 and multiple storage devices 104 having improved error detection and fault isolation.

SUMMARY OF THE INVENTION

The problems which presently exist in the field of technology discussed above have been alleviated by the present invention. Specifically, the present invention provides a system and method for transferring data between multiple asynchronous storage devices and a single channel unit. In addition, this transferring of data is done in a way which provides for improved error detection and fault isolation.

More specifically, one embodiment of the present invention contemplates a channel unit, which interfaces with two or more asynchronous storage devices (assumed to contain stored data) across a control bus and a data bus. This embodiment contemplates a first means for receiving data-ready signals from the storage devices across the control bus. These data-ready signals indicate that the storage devices are ready to send stored data across the data bus.

Upon receiving these data-ready signals, the present invention contemplates use of second means for generating and sending read strobe signals to the storage devices across the control bus. These read strobe signals are meant to indicate to the storage devices that the channel unit is ready to receive the stored data from the storage devices.

The present invention further contemplates a third means for indicating when a specific amount of time has elapsed since the read strobe signals were generated. This specific amount of time is envisioned to be indicative of the time that it takes for the storage devices to send the stored data across the data bus. Thus, the elapsing of this time indicates that the data on the data bus at the channel unit is valid.

Once this specific amount of time has elapsed, a fourth means then samples the stored data from the data bus. It is then contemplated that the stored data is sent to some host device (such as a host computer).

Another embodiment of the present invention is a method which contemplates executing the steps of receiving device-ready signals from the storage device across the control bus, indicating that the storage devices are ready to send the stored data across the data bus. The next step involves sending read strobe signals across the control bus to the storage devices, in response to receipt of the device-ready signals.

In this method embodiment, the step of sending the read strobe signals initiates the beginning of the validity count-down which, when complete, initiates the step of sampling the data bus.

Alternative embodiments of both embodiments discussed above further contemplate utilizing an array parity error detector for checking data for array parity errors as the data is sent to the storage devices, and for checking the data received from the storage devices. If an array parity error is detected as the data is sent to the storage devices, then the array parity error detector will generate channel error device signals, and send these signals to some controlling device. If array parity errors are detected after the data has come from the storage devices, then the array parity error detector will generate storage device error signals, and send the signals to the controlling device. The action taken as a result of these error signals is contemplated to be at the discretion of the controlling device.

In addition, it should be understood that the embodiments noted above can be implemented as both hardware and software embodiments, or a combination thereof.

BRIEF DESCRIPTION OF THE DRAWINGS

Various objects, features, and attendant advantages of the present invention can be more fully appreciated as the same become better understood with reference to the following detailed description of the present invention when considered in connection with the accompanying drawings, in which.

DETAILED DESCRIPTION OF THE PREFERRED EMBODIMENTS

I. Overview

The present invention is a system and method for transferring data between asynchronous devices. More specifically, this invention relates to a system and method for transferring data between a single channel device and multiple asynchronous storage devices simultaneously, and for performing such transfer with improved error detection and fault isolation.

In general, the present invention facilitates the efficient receipt of data from multiple asynchronous storage devices into a single channel unit. In embodiments of the present invention, the present invention also detects array parity errors, and determines whether these errors were caused as a result of the channel unit, or from one of the storage devices. An overview of the present invention can be better explained with reference to FIG. 2.

Figure 2:
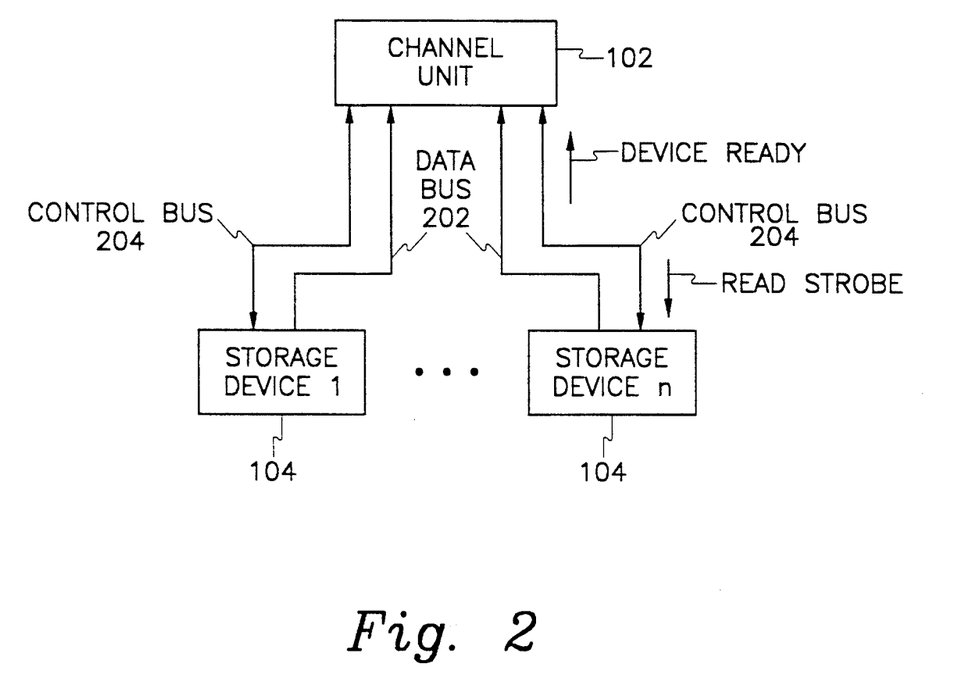
FIG. 2 is a high-level block diagram of an embodiment of the present invention.

FIG. 2 shows a channel unit 102 (in which embodiments of the present invention are contemplated to reside), and its surrounding environment. This environment includes n storage devices 104 (where n is an integer of 2 or more), a data bus 202, and a control bus 204. While two buses are shown in FIG. 2, it should be understood that a single bus could also be used. That is, each link of the control bus 204 and data bus 202 which is attached to a particular storage device of storage devices 104 could comprise a single, physical link.

In the environment envisioned for use with the present invention, each of the storage devices 104 have their own oscillators (timing devices), as does channel unit 102. Thus, each of these devices operates asynchronously with one another. In addition, embodiments contemplated by FIG. 2 assume that the storage devices 104 already contain stored data.

The control bus 204 is used to pass control signals between the channel unit 102 and storage devices 104. In embodiments of the present invention, two control signals are used to facilitate the reading of stored data from the storage devices 104. The first of these signals is the "device-ready" signal, which is received by the channel unit 102 from the storage devices 104 when the storage devices 104 are ready to send stored data to the channel unit 102. The present invention thus contemplates an environment where the storage devices 104 are given a command from some external control device to send stored data to the channel unit 102.

In embodiments of the present invention, the channel unit 102 takes no action until it receives a device-ready signal from each of the n storage devices 104. Once all of the device-ready signals have been received, the channel unit 102 generates and sends "read strobe" signals across control bus 204 to the storage devices. This is to indicate to the storage devices 104 that they should now send their stored data over data bus 202. Thus, the present invention contemplates use in an environment where the storage devices 104 are responsive to the read strobe signals.

At the same time that the read strobe signal is sent, the channel unit 102 begins a "validity count-down." This count-down, in embodiments of the present invention, represents the minimum amount of time it takes between when the read strobe signals are sent and when the stored data from the storage devices 104 is received by the channel unit 102. In any event, when some specific amount of time has elapsed as indicated by the validity count-down, the channel unit 102 knows that when it samples data from the data bus 202 that the data will be valid (that is, it will be the stored data sent from the storage devices 104).

By using the present invention as described above, stored data from storage devices 104, which are asynchronous to each other, can be received concurrently by the channel unit 102, which is itself asynchronous to the storage devices 104. This stored data is then typically sent to a host computer (not shown) which requested the stored data or, where the stored data is striped, is first sent to a device (not shown) to interleave the stored data.

Figure 3:
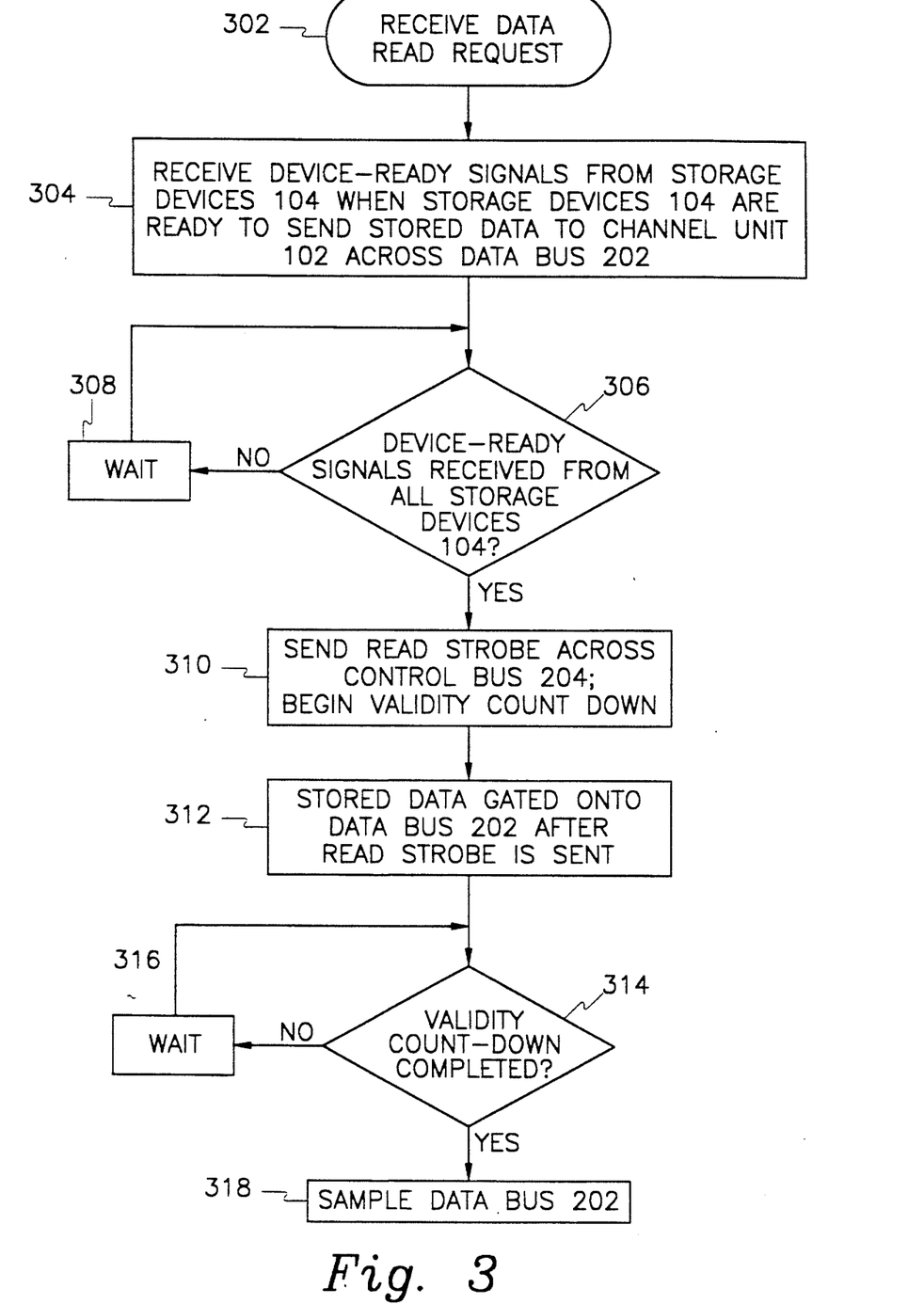
FIG. 3 is a high-level flow diagram of a method contemplated by an embodiment of the present invention.

Embodiments of a method of operation of the present invention are described using the flow chart of FIG. 3. Referring now to FIG. 3, the method contemplated assumes that a data read request to initiate the process of reading data from the storage devices has been received. This is indicated by starting block 302.

Once this request has been processed, it is contemplated that the present invention will receive device-ready signals from the storage devices 104, indicating that the storage devices 104 are ready to send their stored data to the channel unit 102 across the data bus 202. This is shown by a block 304. The channel unit 102 will not take any action, however, until device-ready signals from all of the storage devices 104 have been received. This is indicated by a decision block 306 and a block 308.

Once device-ready signals have been received from all storage devices 104, the channel unit 102 sends a read strobe signal across the control bus 204 to the storage devices 104. At the same time that the read strobe signals are sent, the validity count-down (as described above with regard to FIG. 2) begins, as indicated by a block 310.

Once each of the storage devices 104 have received the read strobe signals, it is contemplated that each storage device 104 will gate a word of data onto the data bus 202 and sent the word across the data bus 202 to the channel unit 102. This is indicated by a block 312. The channel unit 102 will wait until the validity count-down is completed before sampling the data bus 202, as indicated by a decision block 314 and a block 316.

When the validity count-down has completed, the channel unit 102 then samples the data bus 202. This is shown by decision block 314, and blocks 316 and 318. The present invention then passes the data onto some other host device, as indicated above. In embodiments of the present invention, if more words are subsequently required to be passed across the data bus 202, then the sequence of events will begin again starting with block 310.

II. Array Parity Error Detection

In addition to providing a mechanism for receiving stored data from asynchronous storage devices 104, embodiments of the present invention also provide for improved error detection and fault isolation. This is accomplished using array parity error detection for data which is to be stored on the storage devices 104, as well as for stored data received from the storage devices 104. Thus, if an error is detected in data being sent to the storage devices 104, the error will be known to have occurred at or before the channel unit 102. If no error occurs at the channel unit 102, but an error occurs when the same data is sent to the channel unit 102 from the storage devices 104, then the error will be known to have occurred from the storage devices 104. In this way, error detection and fault isolation is facilitated by the identification of the existence of array parity errors, and the identification of the general location from which the errors came.

Figure 4:
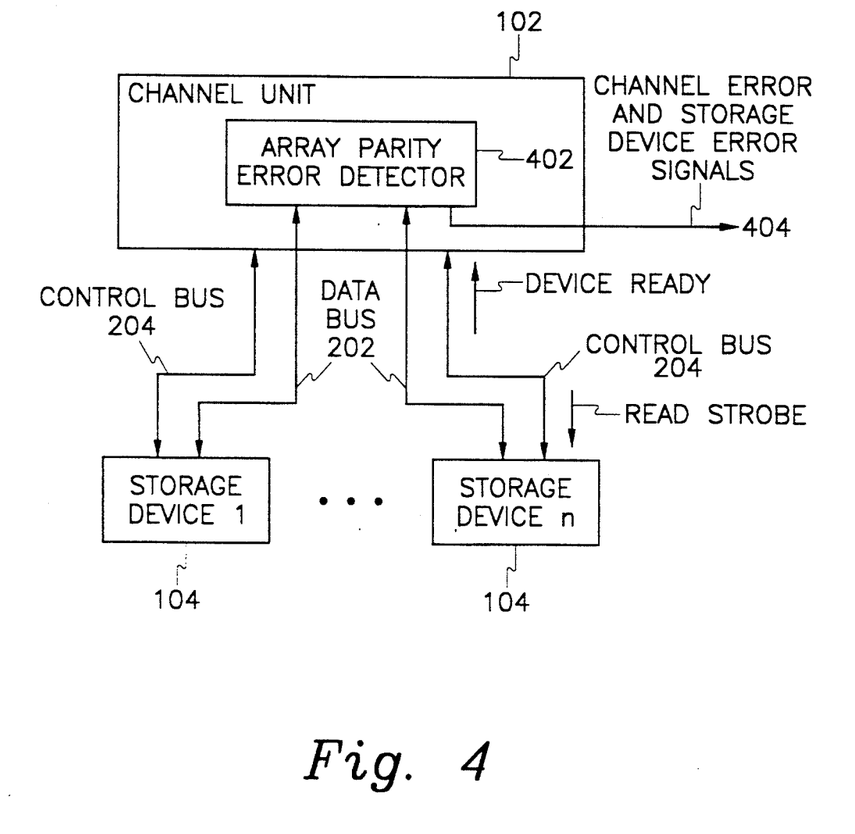
FIG. 4 is a block diagram of an embodiment of the present invention having array parity error detection.

FIG. 4 shows embodiments of the present invention described above. IN order to check for parity, the present invention assumes an environment in which at least one of the storage devices (and thus one of the bus links of data bus 202) is used for parity purposes. Thus, some mechanism is also assumed which generates parity data from the data to be stored.

Referring now to FIG. 4, an array parity error detector 402 within channel unit 102 samples each word of data which is sent across the bus links of data bus 202 to each of the storage devices 104. The data is presumed to have been sent to the channel unit by a device such as a host computer, and is contemplated to already have been split into separate portions (for example, striped).

When the array parity error detector 402 samples each word, it checks the word for array parity errors. In other words, the totality of the data sent across the bus links of the data bus 202 at a given time (that is, a "word" of data) are summed, and are checked for either even or odd parity (depending upon the parity scheme used).

If a parity error is detected by the array parity error detector 402 as the data is sent to the storage devices 104, then the array parity error detector 402 will generate a channel error signal across line 404. This signal can be sent to any number of devices for appropriate action. Such action might include re-sending the data across the data bus 202, or indicating that a "fatal" error has occurred.

Upon receipt of a data read request, the data which was stored on the storage devices 104 is sent back to the channel unit 102 in the manner described above with regard to FIG. 2. In addition, embodiments contemplated by FIG. 4 further include that the array parity error detector 402 samples the stored data when it is sent to the channel unit 102 from the storage devices 104. If a parity error is detected, the array parity error detector 402 generates a device error signal, and sends it across line 404. In this way, the present invention can indicate where the error occurred.

Figure 5A:
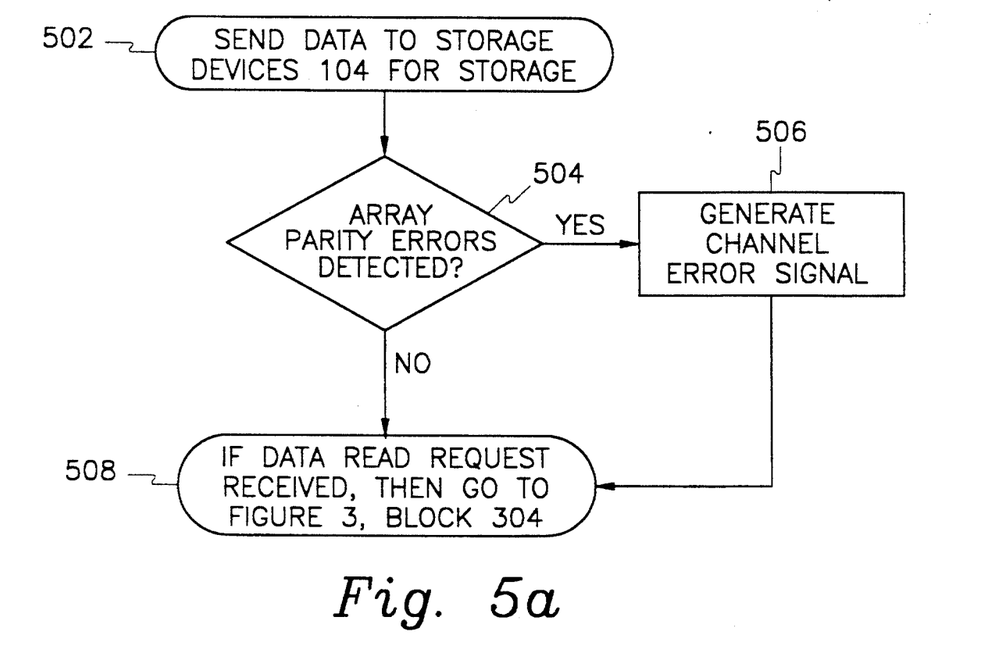
FIG. 5a is a flow diagram of a method contemplated by an embodiment of the present invention where array parity errors caused by a channel unit are detected.
Figure 5B:
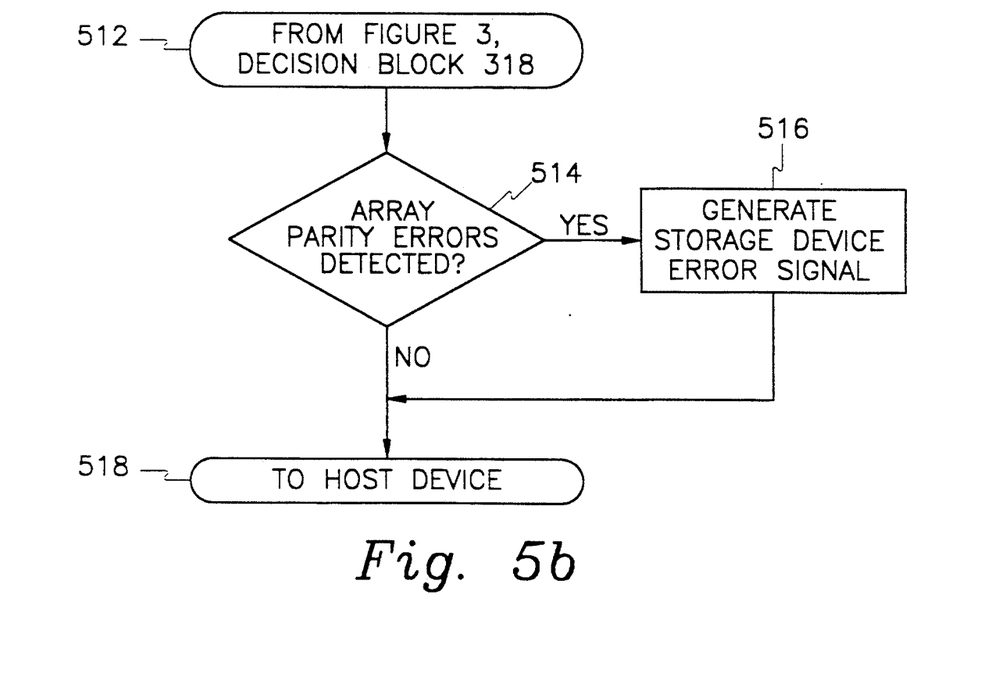
FIG. 5b is a flow diagram of a method contemplated by an embodiment of the present invention where array parity errors caused by a storage device are detected.

Embodiments of a method of operation of the present invention are described using the flow chart of FIGS. 5a and 5b. These embodiments contemplate that these figures are an integral part of the method diagrammed in FIG. 3.

Referring first to FIG. 5a, during the storage of data to the storage devices 104, a determination is made as to whether any array parity errors have been detected. This is indicated by a starting block 502 and a decision block 504. If an array parity error is detected at this time, then a channel error signal will be generated, as indicated by a block 506.

If a device in the environment of the present invention receives the channel error signal and determines that a fatal error has occurred, then the entire process described with regard to these figures will terminate. However, the action taken in response to the generation of a channel error signal may also be of a less serious nature.

Assuming that a fatal error has not occurred, when no more data is to be sent to the storage devices 104, other events such as a data read request can subsequently take place. If a data read request is received, then the operation beginning with block 304, FIG. 3, will occur. This is indicated by an ending block 508.

The method of operation beginning with block 304 of FIG. 3 executes as described above. After the data bus 202 has been sampled as indicated by block 318, a determination is again made regarding whether any array parity errors have been detected. This is indicated by a starting block 512 and decision block 514 of FIG. 5b. If errors have been detected, then a storage device error signal is generated, as indicated by a block 516. Again, the course of action which is taken when errors have been detected will be at the discretion of a control device. Such a control device could be, for example, part of the channel unit 102, or part of some other entity.

III. Channel Unit Components and Environment

Figure 6:
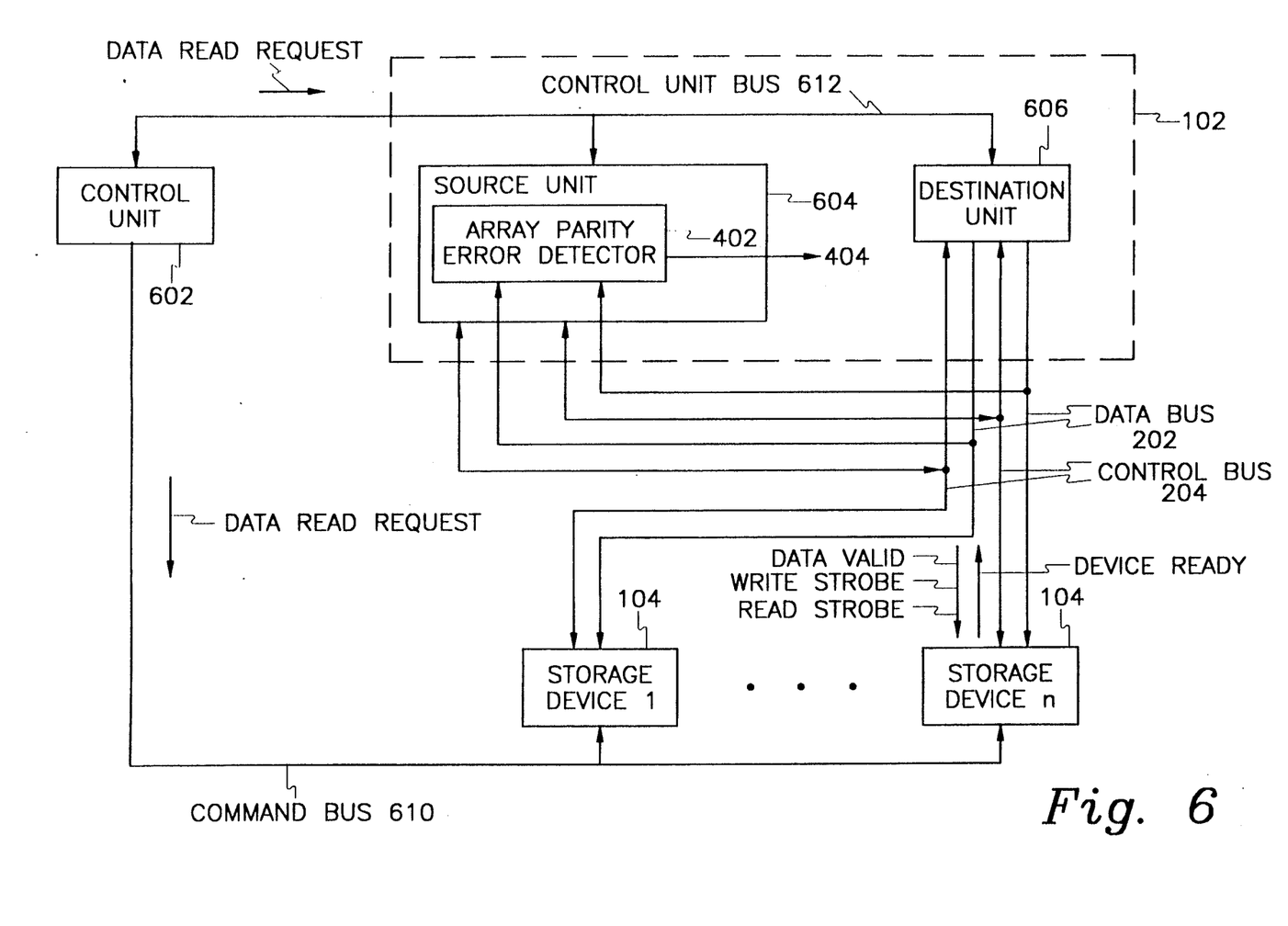
FIG. 6 is a block diagram of an embodiment of the present invention and a contemplated environment where the channel unit and control bus comprise multiple components.

FIG. 6 shows a more detailed view of embodiments of the present invention and their environment. Referring now to FIG. 6, the channel unit 102 is shown to comprise a source unit 604 and a destination unit 606. The array parity error detector 402 is located in the source unit 604. In addition, embodiments of the present invention contemplate use in an environment where a control unit 602 controls the initiation of certain events affecting the present invention (such as those events pertaining to the writing and reading of data to and from the storage devices 104).

In the environment contemplated for use with the present invention, the control unit 602 receives signals from a device such as a host computer (not shown) regarding whether data is coming from the host computer which needs to be stored on the storage devices 104, or whether data is to be read from the storage devices 104 and sent to the host computer. When data is to be written to the storage devices 104, the destination unit 606 receives signals to this effect from the control unit 602 across control unit bus 612, and also receives data from the host computer. The destination unit 606 then sends that data to the storage devices 104 across data bus 202.

Similarly, the source unit 604 also receives signals in the form of a data read request from the control unit 602 across control unit bus 612 when the host computer requests data from the storage devices 104. The source unit 604 subsequently receives stored data from the storage devices 104 to be sent to the host device.

As indicated above, embodiments of the present invention envision that the array parity error detector 402 is within source unit 604. This is because the design of the data bus 202 enables the source unit 604 to receive data when the destination unit 606 is sending data to the storage devices 104 (during a write), as well as when the storage devices 104 are sending data to the source unit 604 (during a read). This design makes it more efficient for the array parity error detector 402 to check for parity errors during a read and during a write, and to ultimately determine whether any errors detected are due to the channel unit 102 or to the storage devices 104. Further, in embodiments of the present invention, the channel and storage device error signals are microprocessor interrupts which can be sent, for example, to a microprocessor located on some central control mechanism such as control unit 602.

In embodiments of the present invention, a device such as a host computer sends the destination unit 606 a block of striped data to be stored on the storage devices 104. While these embodiments contemplate that the destination unit 606 receives the striped data, it should be understood that other configurations are also possible, including that where the destination unit 606 is the device in which the data is striped.

The destination unit 606 then gates a word of data onto the data bus 202, and sends data valid and write strobe signals across control bus 204 to indicate to the storage devices 104 that the data is valid. This write strobe (in embodiments of the present invention) is generated by the destination unit 606, and sent to the storage units 104 across control bus 204 to indicate when the storage units 104 should sample data on the data bus 202. Thus, the present invention contemplates use in an environment where storage devices 104 are receptive to the signals sent across the control bus 204.

In embodiments of the present invention, the functioning of the array parity error detector 402 is triggered by the write strobe. Also in embodiments of the present invention, each link of the data bus 202 is four bites wide. Consequently, 4 n bytes (where n is the number of storage devices, and thus the number of data bus links) can be gated onto the data bus 202 at once. Thus, the size of a word in these embodiments is 4 n bytes.

In environments envisioned by embodiments of the present invention, when the host computer wishes to receive data stored on the storage devices 104, it communicates this to the control unit 602, which then sends a data read request message to the storage devices 104 across a command bus 610, and to the source unit 604 across the control unit bus 612. The storage devices then send their device-ready signals to the channel unit 102 across the control bus 204. Source unit 604 then sends data valid and read strobe signals to the storage devices 104 back across the control bus 204, which are envisioned in the environment contemplated by the present invention to cause the storage devices 104 to gate a word of data onto the data bus 202.

The mechanism for attaining the data from the storage devices 104 is discussed regarding FIGS. 2 and 4 above, except that any data that passes across the data bus 202 will only be considered valid data when the data valid signal is asserted. Otherwise, that which is sent across the data bus 202 after a read strobe signal will be considered a control word. The same applies during a write.

Figure 7A:
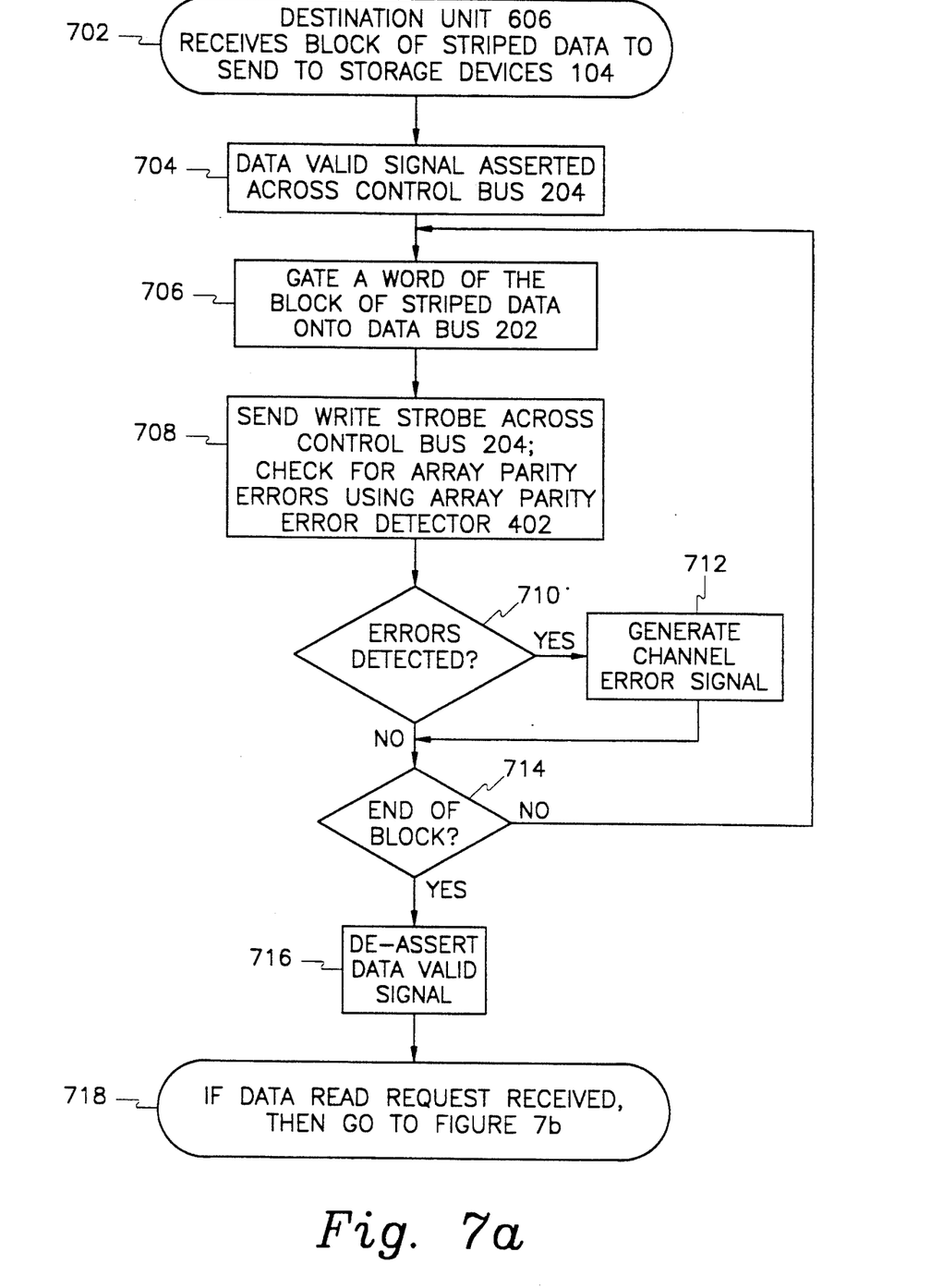
FIG. 7a is a flow diagram of a method for writing data contemplated by an embodiment of the present invention indicating the use of specific events, signals, and array parity error detection.

Embodiments of a method of operation of the present invention will now be described with regard to FIGS. 7a and 7b. Referring first to FIG. 7a, the operation of these embodiments begin when the destination unit 606 receives a block of striped data to send to the storage devices 104, as shown by a block 702. Once the block of striped data is received, a data valid signal is asserted across control bus 204.

Once a data valid signal has been asserted, a word of the block of striped data is gated on to the data bus 202 as indicated by a block 706. A write strobe signal is then asserted across the control bus 204 by the destination unit 606. The asserting of the write strobe signal triggers the array parity error detector 402 to check for any array parity errors. This is indicated by a block 708. If any errors are detected, then a channel error signal will be generated (as discussed above with regard to FIG. 5a). This is indicated by a decision block 710 and a block 712.

If the block of striped data has not been completely sent to the storage devices 104, then another word of the block of striped data will be gated onto the data bus 202, as indicated by a decision block 714 and a block 706. If, however, the end of the block of striped data has been reached, then the data valid signal will be de-asserted, as indicated by block 716. FIG. 7a then shows that if a data read request is received, that the next step is initiate the operation shown in FIG. 7b. It should be understood, however, that other events, such as the receipt of additional blocks of striped data, can occur in lieu of receipt of a device-ready signal. In other words, a write to and a read from the storage devices 104 are two separate, independent events. However, the combination of these two events completely describes certain embodiments of the present invention.

Figure 7B:
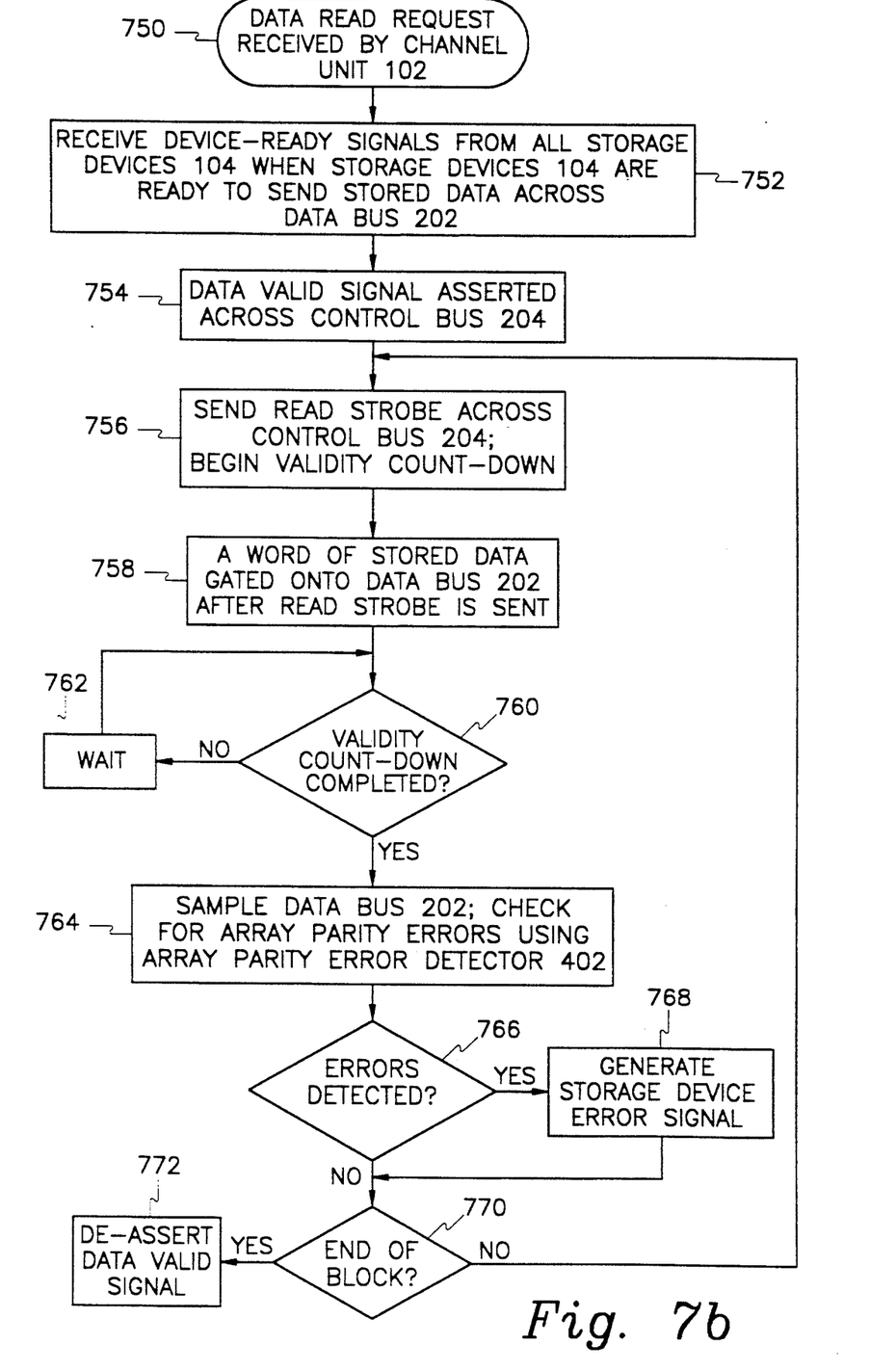
FIG. 7b is a flow diagram of a method for reading data contemplated by an embodiment of the present invention indicating the use of specific events, signals, and array parity error detection.

Referring now to FIG. 7b, the initiation of a read begins when a data read request is received by channel unit 102, as indicated by block 750 of FIG. 7b. This request is also envisioned as being sent to the storage devices, and will thus cause device-ready signals to be received from the storage devices 104 when the storage devices 104 are ready to send data across the data bus 202. No further action will be taken by the present invention, however, until device-ready signals are received from all of the storage devices 104. This is indicated by a block 752.

Once all of the storage devices 104 have asserted device-ready signals, a data valid signal will be asserted across control bus 204, as indicated by a block 754. Read strobe signals are then sent across the control bus 204, and the validity count-down begins, as indicated by a block 756. In the environment contemplated for use with the present invention, the sending of the read strobe signals will cause a word of stored data on the storage devices 104 to be gated onto data bus 202, as indicated by a block 758.

Once the validity countdown has been completed as indicated by a decision block 760 and a block 762, the data bus 202 is sampled. In embodiments of the present invention, the sampling of the data bus 202 triggers the array parity error detector 402 to check for any array parity errors in the sampled data. This is indicated by a block 764. If errors are detected, then (as described above) a storage device error signal is generated, as indicated by a decision block 766 and a block 768.

If the entire requested block of stored data has not yet been sent across the data bus 202, then another read strobe signal will be sent across the control bus 204, and the validity count-down will begin again. This is indicated by a decision block 770 and a block 756. If, however, the end of the block has been reached, then the data valid signal will be de-asserted, as indicated by a block 772.

IV. Timing Diagram of Read Strobe Mechanism

Figure 8:
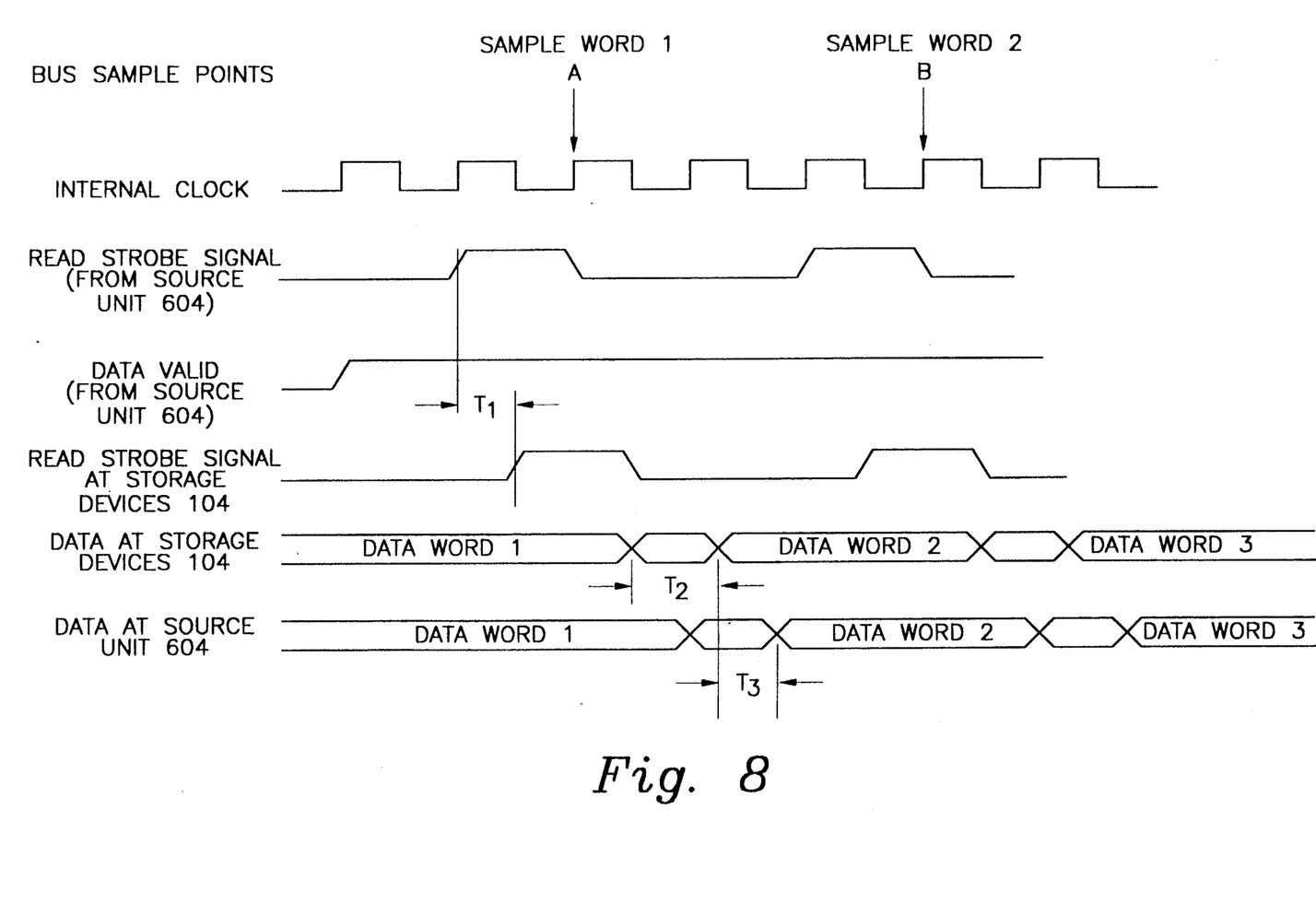
FIG. 8 is a timing diagram of the events that occur regarding the present invention when data is sent from the storage devices.

The general scheme used in the present invention for efficiently reading data from multiple asynchronous storage devices 104 can be better explained with regard to the timing diagram of FIG. 8. Referring to FIG. 8, an internal clock is shown which, in embodiments of the present invention, reside in the source unit 604. Of course, this internal clock can reside in any number of devices which are either part of the present invention, or a part of its environment.

Once the device-ready signals have been received from all of the storage devices 104, the data valid signal is raised as shown. It is kept in the raised position, until the entire block of stored data has been received by the source unit 604.

After the data valid signal has been sent (and in various embodiments of the present invention, every three clock cycles thereafter), the read strobe signal is sent from source unit 604. Time T1 is the time required for the read strobe signal to propagate from the source unit 604 to the storage devices 104.

In the environment contemplated for use with the present invention, the storage devices 104 begin to gate a new word (that is, the next word) of data onto data bus 202 upon receipt of the falling edge of the read strobe signal. The data bus 202 is sampled by the source unit 604 at the same time as the fall of a read strobe signal at the source unit 604. This is shown in FIG. 8 at the point where sample word 1 is shown. Thus, the sampling of each word takes place a significant amount of time prior to gating the next word onto the data bus 202. It should be noted, however, that for only the very first data word, valid data can be sampled prior to the fall of the very first read strobe signal.

The time shown as T2 is the transition time necessary to gate valid data onto the data bus 202. Time T3 is the time for the new data word to propagate from storage devices 104 to the source unit 604. Consequently, the validity count-down must, at a minimum, be a sum of T1, the pulse width of the read strobe signal, T2 and T3. This will ensure that the sampled data will be valid.

In embodiments described with regard to FIG. 8, it is assumed that the environment used with the present invention is such that the storage devices 104 use edge-sensitive logic (that is, that have edge-triggered flip flops). However, it should be understood that the present invention also contemplates use with level sensitive logic as well.

V. Specific Advantages and Embodiments

As indicated above, the environment contemplated for use with embodiments of the present invention envisions that array parity information is generated prior to sending the data to the storage devices 104. Doing so allows the present invention to detect certain types of errors otherwise not detected using conventional techniques such as CRC (cyclic redundancy checking) or ECC (Error Correction Code). For example, if during a write the storage devices 104 fail in such a way that causes the same data block or data word to be written to the device media over and over again, rather than writing a succession of blocks or words, a subsequent read of this data will not cause any ECC or CRC errors, since any ECC or CRC generated for the purpose of error detection would likely be generated as a result of the corrupt data. The result will cause the channel unit 102 to send corrupt data to the host without any indication that the data is bad.

The occurrence of such a malfunction, as well as other types of malfunctions and errors not detected by conventional CRC or ECC techniques, are detected using the array parity error detector 402 of the present invention. Since the parity information is a function of the data that the channel unit 102 attempted to write to the storage devices 104, that parity information will detect the type of errors discussed above.

In embodiments of the present invention, it is contemplated that the logic for receiving, processing and sending signals within the channel unit 102 is controlled by ASIC VLSI technology. It is also contemplated that the validity count-down occurs on the source unit 604.

It should be noted that in setting the amount of time for the validity count-down, the process variation between different samples of VLSI ASIC technology must be taken into account. For example, since the technology used for the source unit 604 is mass-produced, there will be some variation between the validity count-down of one source unit 604 and another which must be accounted for. Of course, variations in the technology used in the environment of the present invention (for example, that of the storage devices 104) must also be taken into account.

Embodiments of the present invention contemplate more than one driver to send the various signals. For example, certain embodiments contemplate using one driver per signal per storage device used (thus, n drivers per signal). The selection of the drivers used to drive signals should use a driver slew rate that meets the requirements of the system simultaneous switching noise tolerance, and the system performance. In order to facilitate these embodiments, it is envisioned that the switching of the drivers be staggered in some fashion to effectively reduce simultaneous switching-induced noise.

It should be understood that the present invention can be implemented in software embodiments. In such embodiments, the various components and steps would be implemented in software to perform the functions of the present invention. Any presently available or future developed computer software language can be employed in such software embodiments of the present invention.

It should further be understood that present invention is not limited to the embodiments indicated above, and that the examples presented above are merely for the purposes of illustration. The scope of the present invention should therefore be interpreted by the following claims as defined by the forgoing figures and text.

What is claimed is:

1. A system for receiving stored data across a data bus, wherein control signals are passed across a control bus, the system comprising:

two or more asynchronous storage devices for the stored data, each storage device including a timing device ad an oscillator for driving said timing device;

first means for receiving device-ready signals from the storage devices across the control bus indicating that said two or more asynchronous storage devices are ready to send the stored data across the data bus;

second means, responsive to said first means, for generating and sending read strobe signals to said two or more asynchronous storage devices across the control bus to indicate readiness to receive the stored data from said two or more storage devices;

third means for indicating that a predetermined time period has elapsed since said read strobe signals were generated, thereby indicating that said two or more asynchronous storage devices have sent the stored data across the data bus, and that the stored data from the data bus is valid; and fourth means, responsive to sad third means, for sampling from the data bus to receive the stored data.

2. The system of claim 1, wherein a single bus is sued as the control bus and as the data bus.

3. The system of claim 1, wherein said first means comprises a source unit using ASIC VLSI technology.

4. The system of claim 1, wherein said second means generates and sends a data valid signal across the control bus prior to sending the read strobe signals across the control bus.

5. The system of claim 1, wherein a driver is used for each of the storage devices in sending said read strobe signals across the control bus.

6. The system of claim 1 wherein said predetermined time period is substantially equal to the sum of: the time required for said read strobe signals to propagate from said second means to said two or more asynchronous storage devices; the time required for said two or more asynchronous storage devices to gate the stored data onto the data bus; the time required for the stored data to propagate from the storage devices to said second means; and a duration of a pulse of said read strobe signal.

7. A system, having improved error detection and fault isolation, for transferring data to and from two or more asynchronous storage devices across a data bus, wherein control signals are passed to and from the storage devices across a control bus, comprising:

first means, for detecting an array parity error in the data and generating a channel error signal when the data is sent to the storage devices across the data bus to be stored, the storage devices forming stored data;

second means for receiving device-ready signals across the control bus from the storage devices indicating that the storage devices are ready to send said stored data across the data bus;

third means, responsive to said second means, for generating and sending read strobe signals to the storage devices across the control bus to indicate readiness to receive said stored data from the storage devices;

fourth means for indicating that a specific amount of time has elapsed since said read strobe signals were generated, thereby indicating that the storage devices have sent said stored data across the data bus, and that said stored data from the data bus is valid; and fifth means, responsive to said fourth means, for sampling said stored data from the data bus;

said first means, further being responsive to said fifth means, for detecting an array parity error in said stored data and generating a storage device error signal.

8. The system of claim 7, wherein a single bus is used as the control bus and as the data bus.

9. The system of claim 7, wherein said second means comprises a source unit using ASIC VLSI technology.

10. The system of claim 7, wherein said third means generates and sends a data valid signal across the control bus prior to sending the read strobe signals across the control bus.

11. The system of claim 7, wherein a driver is used for each of the storage devices in sending said read strobe signals across the control bus.

12. The system of claim 7, wherein said channel error signal and said storage device error signal comprise microprocessor interrupts.

13. The system of claim 7, wherein said first means is triggered by a write strobe, and by said fifth means.

14. A method for simultaneously receiving stored data from two or more asynchronous storage devices across a data bus, wherein control signals are passed to and from the storage devices across a control bus, the method comprising the steps of:

(1) receiving device-ready signals from the storage devices across the control bus, indicating that the storage devices are ready to send the stored data across the data bus;

(2) sending read strobe signals across the control bus to the storage devices, in response to said step (1);

(3) beginning a validity count-down, in response to said step (2); and (4) sampling the data bus when the validity count-down in said step (3) has completed.

15. The method of claim 14, further comprising the step of using one bus as the control bus and as the data bus.

16. The method of claim 14, further comprising a step between said steps (1) and (2) of generating and sending a data valid signal across the control bus.

17. The method of claim 14, wherein said step (2) comprises the step of using a driver for each of the storage devices in sending said read strobe signals across the control bus.

18. A method, having improved error detection and fault isolation, for transferring data to and from two or more asynchronous storage devices across a data bus simultaneously, wherein control signals are passed to and from the storage devices across a control bus, the method comprising the steps of:

(1) checking for array parity errors in data transferred across the data bus to the storage devices, the storage devices forming stored data;

(2) generating a channel error signal upon the detection of array parity errors;

(3) receiving device-ready signals from the storage devices across the control bus, indicating that the storage devices are ready to send the stored data across the data bus;

(4) sending read strobe signals across the control bus to the storage devices, in response to said step (3);

(5) beginning a validity count-down, in response to said step (4);

(6) sampling the data bus once the validity count-down in said step (5) has completed;

(7) checking for array parity errors in said stored data transferred across the data bus from the storage devices; and (8) generating a storage device error signal upon the detection of array parity errors.

19. The method of claim 18, further comprising the step of using one bus as the control bus and as the data bus.

20. The method of claim 18, further comprising the step between said steps (3) and (4) of generating and sending a data valid signal across the control bus.

21. The method of claim 18, wherein said step (4) comprises the step of using a driver for each of the storage devices in sending said read strobe signals across the control bus.

22. The method of claim 18, wherein said step (2) and said step (8) further comprise the step of generating microprocessor interrupts.

23. The method of claim 18, wherein said step (1) comprises the step of being triggered by a write strobe.

* * * * *